(12) United States Patent
Iwata

(10) Patent No.: US 7,237,961 B2
(45) Date of Patent: Jul. 3, 2007

(54) ROLLING BEARING

(75) Inventor: Takashi Iwata, Nara (JP)

(73) Assignee: Koyo Seiko Co., Ltd., Osaka-shi, Osaka (JP)

( * ) Notice: Subject to any disclaimer, the term of this patent is extended or adjusted under 35 U.S.C. 154(b) by 134 days.

(21) Appl. No.: 10/878,347

(22) Filed: Jun. 29, 2004

(65) Prior Publication Data

US 2004/0264824 A1 Dec. 30, 2004

(30) Foreign Application Priority Data

| Jun. 30, 2003 | (JP) | P.2003-186403 |
| Mar. 19, 2004 | (JP) | P.2004-079988 |
| Mar. 25, 2004 | (JP) | P.2004-088561 |
| Apr. 7, 2004 | (JP) | P.2004-112661 |

(51) Int. Cl.
F16C 33/78 (2006.01)

(52) U.S. Cl. .................................................. 384/484

(58) Field of Classification Search ........ 384/484–486; 277/549, 551, 562, 572
See application file for complete search history.

(56) References Cited

U.S. PATENT DOCUMENTS

| 3,021,148 A | 2/1962 | Dickinson |
| 3,395,926 A | 8/1968 | Gunder |
| 3,557,420 A | 1/1971 | Matt et al. |
| 4,304,412 A | 12/1981 | Ladin |
| 4,408,809 A | 10/1983 | Walter et al. |
| 4,428,586 A * | 1/1984 | Romero ...................... 277/565 |
| 4,874,261 A * | 10/1989 | Colanzi et al. ............. 384/484 |
| 5,470,158 A * | 11/1995 | McLarty et al. ............ 384/484 |
| 5,839,834 A | 11/1998 | Acampora, Jr. |
| 2001/0028754 A1 | 10/2001 | Ishiguro et al. |
| 2002/0191877 A1 | 12/2002 | Suzuki et al. |

FOREIGN PATENT DOCUMENTS

| DE | 15 25 057 A | 5/1970 |
| EP | 0 708 263 A1 | 4/1996 |
| EP | 1 239 173 A2 | 9/2002 |
| FR | 1 157 798 | 6/1958 |
| JP | 55109825 A * | 8/1980 |
| JP | 09-210071 | 8/1997 |
| JP | 2001-214964 | 8/2001 |
| JP | 2001-355711 | 12/2001 |
| JP | 2002-130290 | 5/2002 |

OTHER PUBLICATIONS

European Search Report dated Aug. 11, 2004.
European Search Report dated Oct. 29, 2004.

* cited by examiner

*Primary Examiner*—Thomas R. Hannon
(74) *Attorney, Agent, or Firm*—McGinn IP Law Group, PLLC

(57) ABSTRACT

A rolling bearing includes: an inner race; an outer race; rolling elements provided between the inner and outer races; and a seal member provided between end portions of the inner and outer races, which includes a core metal and a rubber seal including a recess and a projection at an outer surface thereof.

14 Claims, 11 Drawing Sheets

ROLLING BEARING

BACKGROUND OF THE INVENTION

This invention relates to a rolling bearing, and more particularly to a rolling bearing suitably used for, for example, a pulley for a compressor for car air-conditioners, and for an idler pulley.

A four-point contact ball bearing having an inner race, an outer race, balls provided between central portions of the two races, and seal members provided between end portions of the two races has heretofore been known (JP-A-2002-130290) as a rolling bearing used for a pulley for a compressor for car air-conditioners.

In a rolling bearing used for a pulley for a compressor for a car air-conditioner, the heat from a compressor body is transmitted the bearing, so that the temperature in an inner portion of the rolling bearing is liable to become high. When a four-point contact ball bearing is used for the same purpose, a slip on the contact portions of the races and balls occurs greatly, and this therefore makes a source of generation of heat. Moreover, when a pulley formed out of a resin is used, the heat in an inner portion of the bearing comes to rarely escape as compared with a case where a pulley formed out of a metal of a high thermal conductivity is used. Therefore, when a four-point ball bearing is used for a compressor in which a resin pulley is used, the temperature of an inner portion of the rolling bearing becomes high. This possibly causes the rubber seals in the rolling bearing to be easily deteriorated, and the seizure-free lifetime of the rolling bearing to be shortened due to the imperfect lubrication of the rolling bearing with grease.

In order to solve the above problems, a rolling bearing disclosed in JP-A-9-210071 in which shielding plates made of metal are used as seal members, and rubber seals are omitted may be used. However, sealing conducted by the metallic shielding plates is a non-contact seal, which is not appropriate for the use of the bearing at high speed.

SUMMARY OF THE INVENTION

An object of the present invention is to provide a rolling bearing and a resin pulley unit in which the rolling bearing is used, characterized in that: the heat radiating effect is so high that the deterioration of rubber seals can be prevented and the seizure-free lifetime can be extended.

Another object of the present invention is to provide a rolling bearing and a resin pulley unit in which the rolling bearing is used, that the sealing ability is sufficiently high even when the rolling bearing is used at high speed; and the radiating effect is so high that the deterioration of the rubber seals can be prevented and the seizure-free lifetime can be extended.

In order to solve the aforesaid object, the invention is characterized by having the following arrangement.

(1) A rolling bearing comprising:
an inner race;
an outer race coaxial with the inner race;
rolling elements provided between the inner and outer races; and
a seal member provided between end portions of the inner and outer races, which includes a core metal and a rubber seal including a recess and a projection at an outer surface thereof.

(2) The rolling bearing according to (1), wherein at least a part of the outer surface of core metals is exposed.

(3) The rolling bearing according to (1), wherein the core metal is made of a material having thermal conductivity higher than that of iron.

(4) The rolling bearing according to (3), wherein the material includes one of aluminum and copper.

(5) The rolling bearing according to (1), wherein
the rubber seal includes an inner annular portion, an outer annular portion and a plurality of connecting portions connecting the inner annular portion to the outer annular portion, and
the plurality of connecting portions defines the protrusions and portions between the plurality of connecting portions defines the recesses.

(6) The rolling bearing according to (5), wherein a part of the core metal corresponding to the portions between the plurality of connecting portions is exposed.

(7) The rolling bearing according to (5), wherein a thickness of the recesses in an axial direction is set not larger than 1/3 of the thickness of the protrusions.

(8) A rolling bearing comprising:
an inner race;
an outer race coaxial with the inner race;
rolling elements provided between the inner and outer races;
a shielding plate including a disk portion and a bent edge portion that is provided to one of inner and outer circumferential edge portions of the disk portion and is directly contacted with the one of the inner and outer races; and
a lip portion which comes into slide contact with the other of the inner and outer races and is provided to the other of the inner and outer circumferential edge portions so that at least a portion of the disk portion is exposed in an axial direction.

(9) The rolling bearing according to (8) further comprising an elastic body for sealing that is bonded to a portion of the bent edge portion to enhance a sealing performance with the one of the inner and outer races.

(10) The rolling bearing according to (8), wherein
the outer race includes an annular groove, the cross section of which is substantially arcuate, and into which the bent edge portion is fitted,
the bent edge portion includes an inclined portion continuing to the outer circumferential edge portion, a linear portion continuing to the inclined portion and a curved portion continuing to the linear portion, the curved portion being directly contacted with a bottom face of the annular groove, the linear portion is contacted with one of side portions of the annular groove and the linear portion being contacted with the other of the side portions of the annular groove via an elastic body for sealing.

(11) The rolling bearing according to (10), wherein the elastic body and the lip portion are integrally formed as the rubber seal.

(12) A rolling bearing comprising:
an inner race;
an outer race coaxial with the inner race;
rolling elements provided between the inner and outer races;
a seal member provided between end portions of the inner and outer races, which includes a rubber seal and a core metal including a bent edge portion coming into contact with one of the inner and outer races.

(13) The rolling bearing according to claim 12, wherein the rubber seal includes a protrusion and a recess at an outside thereof.

(14) The rolling bearing according to claim 12, wherein the core metal includes:
a disk portion;
a cylindrical portion continuing to an outer circumferential edge portion of the disk portion; and
a plurality of bent edge portions that are provided at an end portion of the cylindrical portion and extend outward in a radial direction,
wherein the rubber seal includes:
an engaging portion that is bonded to an outer circumferential edge portion of the disk portion and engaged with an annular groove provided to the outer race; and
a sliding portion that is bonded to an inner circumferential edge portion of the disk portion and comes into slide contact with the inner race, and
wherein the engaging portion includes a filling portion for filling up a gap between the bent edge portions.

(15) A resin pulley unit comprising:
a resin pulley body provided with a plurality of V-grooves in an outer surface thereof; and
a rolling bearing fixed to an inner surface of the pulley body, the rolling bearing including:
an inner race;
an outer race coaxial with the inner race;
rolling elements provided between the inner and outer races;
a seal member provided between end portions of the inner and outer races, which includes a core metal and a rubber seal including a recess and a projection at an outer surface thereof.

(16) A resin pulley unit comprising:
a resin pulley body provided with a plurality of V-grooves in an outer surface thereof; and
a rolling bearing fixed to an inner surface of the pulley body, the rolling bearing including:
an inner race;
an outer race coaxial with the inner race;
rolling elements provided between the inner and outer races;
a shielding plate including a disk portion and a bent edge portion that is provided to one of inner and outer circumferential edge portions of the disk portion and is directly contacted with the one of the inner and outer races; and
a lip portion which comes into slide contact with the other of the inner and outer races and is provided to the other of the inner and outer circumferential edge portions so that at least a portion of the disk portion is exposed in an axial direction.

(17) A resin pulley unit comprising:
a resin pulley body provided with a plurality of V-grooves in an outer surface thereof; and
a rolling bearing fixed to an inner surface of the pulley body, the rolling bearing including:
an inner race;
an outer race coaxial with the inner race;
rolling elements provided between the inner and outer races;
a seal member provided between end portions of the inner and outer races, which includes a rubber seal and a core metal including a bent edge portion coming into contact with one of the inner and outer races.

DETAILED DESCRIPTION OF PREFERRED EMBODIMENTS

The embodiments of the present invention will now be described with reference to the drawings.

First Embodiment

Figure 1:
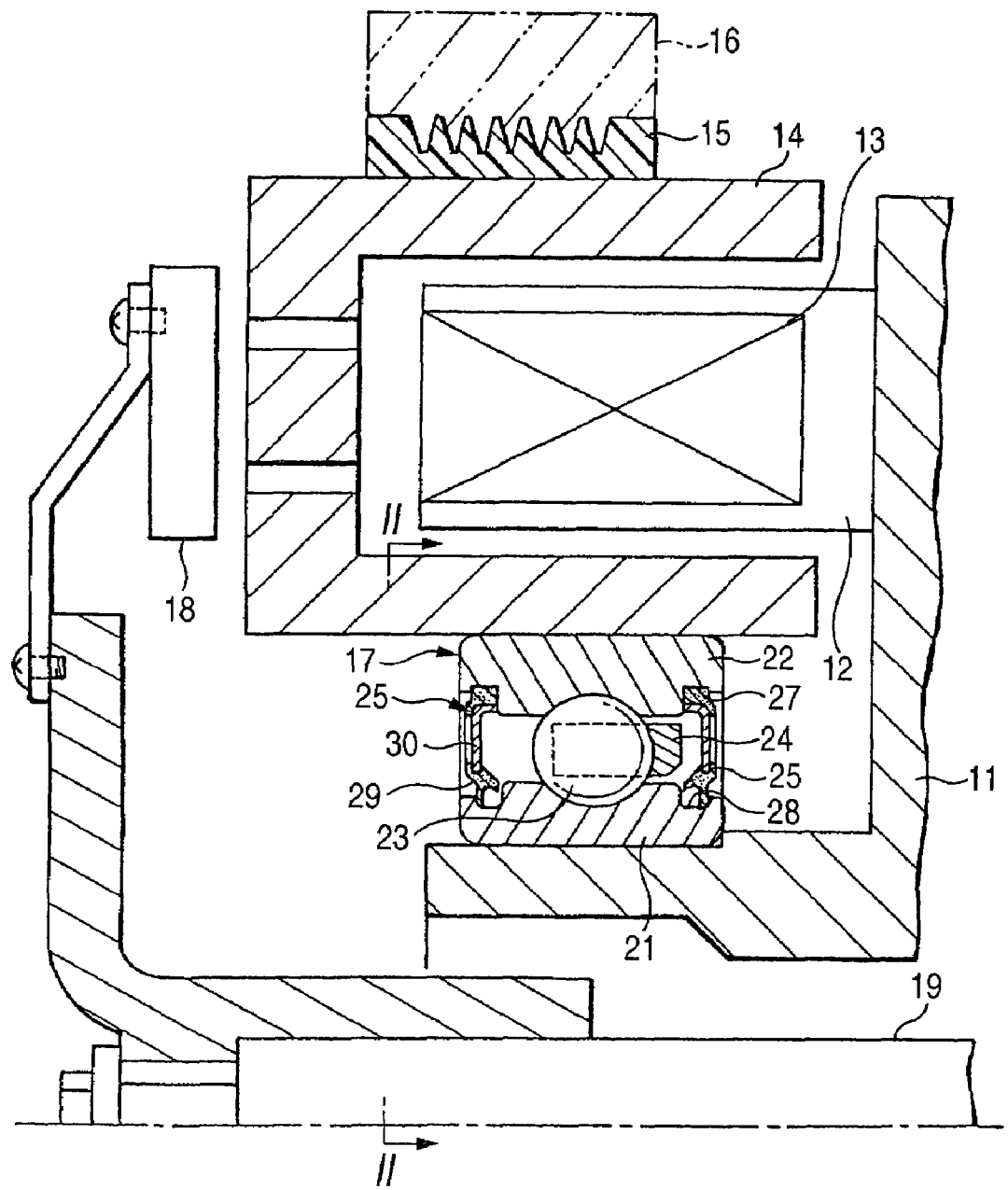
FIG. 1 is a longitudinal sectional view showing a first embodiment of the rolling bearing according to the present invention.
Figure 2:
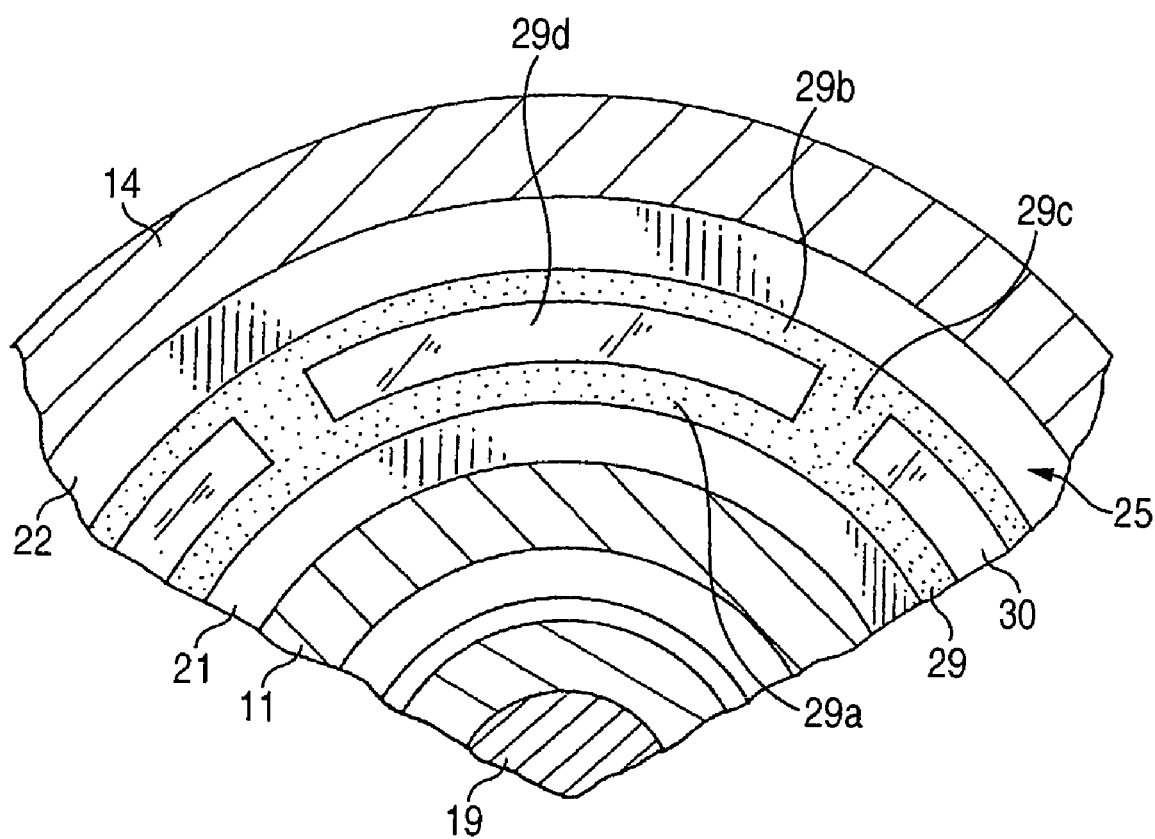
FIG. 2 is a sectional view taken along the line II—II in FIG. 1.

FIG. 1 and FIG. 2 show the rolling bearing according to a first embodiment of the present invention. The "left and right" referred to in the following description shall mean the left and right of FIG. 1.

FIG. 1 shows an electromagnetic clutch unit for transmitting or cutting off a rotational driving force of an engine to or from a compressor of an air-conditioner. This electromagnetic clutch unit is provided with a housing 11 of the compressor, a stator 12 having an electromagnetic coil 13 and fixed to the housing 11, a rotor 14 formed so as to surround the stator 12 and having a C-shaped cross section, a pulley 15 fixed to an outer circumference of the rotor 14 and having a multi-step V-belt wound therearound for transmitting the rotational driving force of the engine to the compressor, a rolling bearing 17 disposed between an inner circumference of the rotor 14 and housing 11 and supporting the rotor 14 rotatably, and an armature 18 sucked to or separated from the rotor 14 in accordance with the ON/OFF of the electromagnetic coil 13 and thereby transmit the rotation of the rotor 14 to a compressor shaft 19.

The rolling bearing 17 is a four-point contact ball bearing having an inner race 21, an outer race 22, balls (rolling elements) 23 provided between central portions of the two races 21, 22, a retainer 24 adapted to retain the balls, and left and right seal members 25, 25 provided between left and right end portions of the two races 21, 22. The balls 23 contact a surface of the inner race 21 at two portions thereof, and a surface of the outer race 22 at two portions thereof as well. The inner race 21 is press fitted or clearance fitted in a cylindrical end portion of the housing 11, while the outer race 22 is press fitted firmly in an inner circumference of the rotor 14.

The outer race 22 is provided at the inner surfaces of the left end portion and right end portion thereof with annular grooves 27, 27. The outer surfaces, which are opposed to these annular grooves 27, 27, of the inner race 21 are also provided with annular grooves 28, 28.

The left and right seal members 25, 25 are formed in the same shape and symmetrically, and each of the seal members includes a ring-shaped rubber seal 29, and a ring-shaped core metal of iron applied to the rubber seal from the axially inner side and thereby reinforcing the same. The seal members 25, 25 are fitted at the outer circumferential edge portions thereof in the annular grooves 27, 27, and the inner circumferential edge portions thereof are in sliding contact with the annular grooves 28, 28 of the inner race 21.

As shown in detail in FIG. 2, the rubber seal 29 of the seal member 25 includes an inner circumferential side annular portion 29a fixed to an inner circumferential edge portion of the core metal 30, an outer circumferential side annular portion 29b fixed to an outer circumferential portion of the core metal 30 and a plurality of connecting portions 29c by which the two annular portions 29a, 29b are joined together. When a portion 29d between the connecting portion 29c and adjacent connecting portion 29c is removed, a part of each of the outer side surfaces of the core metals 30 (left side surface of the core metal 30 of the left seal member 25 and the right side surface of the core metal 30 of the right seal member 25) is exposed.

According to the above-described rolling bearing 17, the heat from the compressor is transmitted to the inner race 21, so that this heat is liable to be confined in this rolling bearing 17. However, since a part of the outer side surface of the core metal 30 is exposed, the heat radiating effect is improved. Moreover, the four-point contact ball bearing 17 can make a source of generation of heat since a slip of the contact portions of the races 21, 22 and balls 23 is large. Therefore, it was difficult that the rolling bearing was applied to the compressor. However, since the rubber seal 29 formed as described above is used, the rolling bearing is applied easily to the compressor. Owing to this advantage, in the electromagnetic clutch unit of a compressor in which a plurality of rows of diagonally contacting ball bearings are used, the bearing can be replaced with the four-point contact bearing 17. This enables a compact rolling bearing of a small weight produced at a lower cost to be provided.

Second Embodiment

Figure 3:
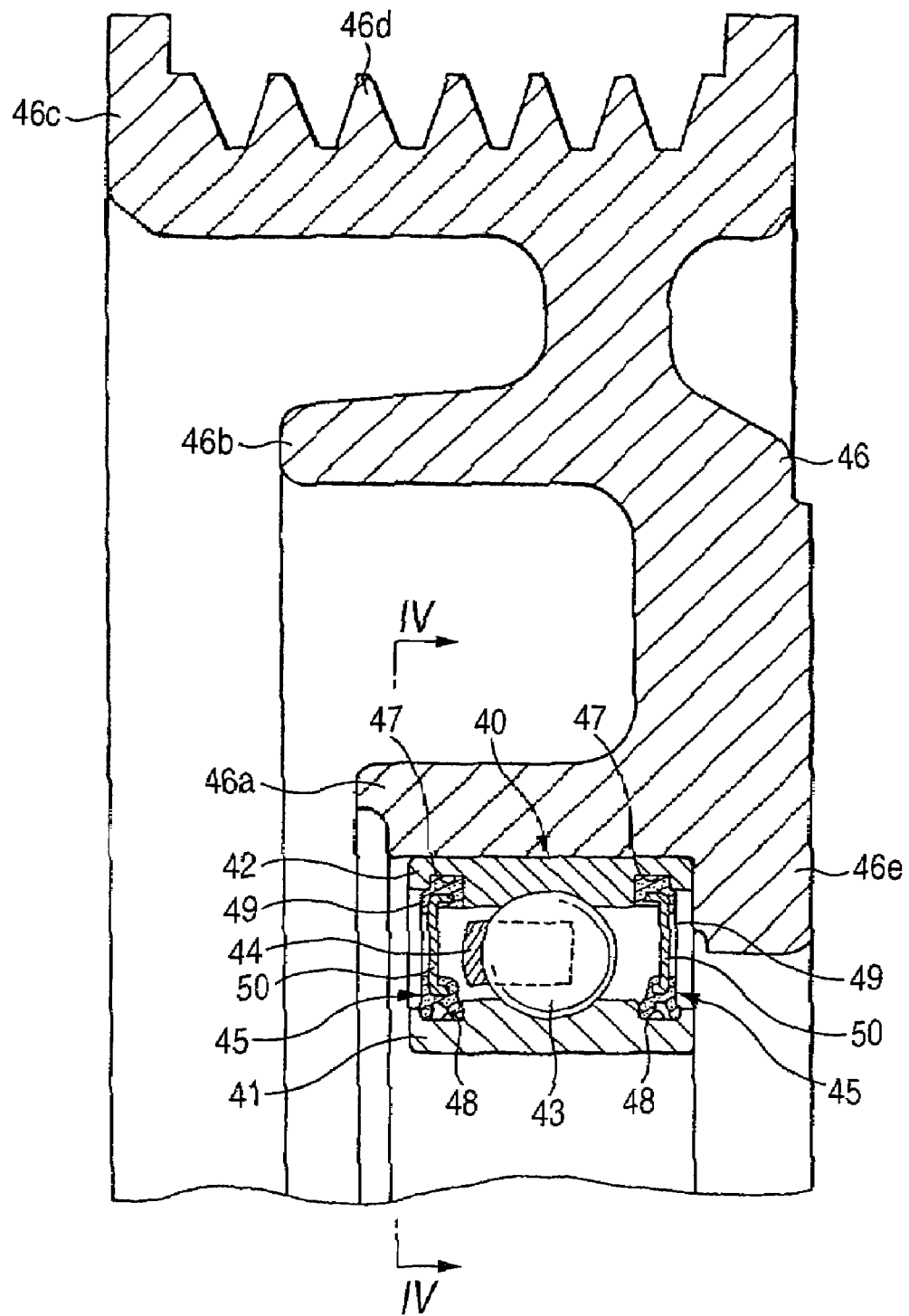
FIG. 3 is a longitudinal sectional view showing a second embodiment of the rolling bearing according to the present invention.
Figure 4:
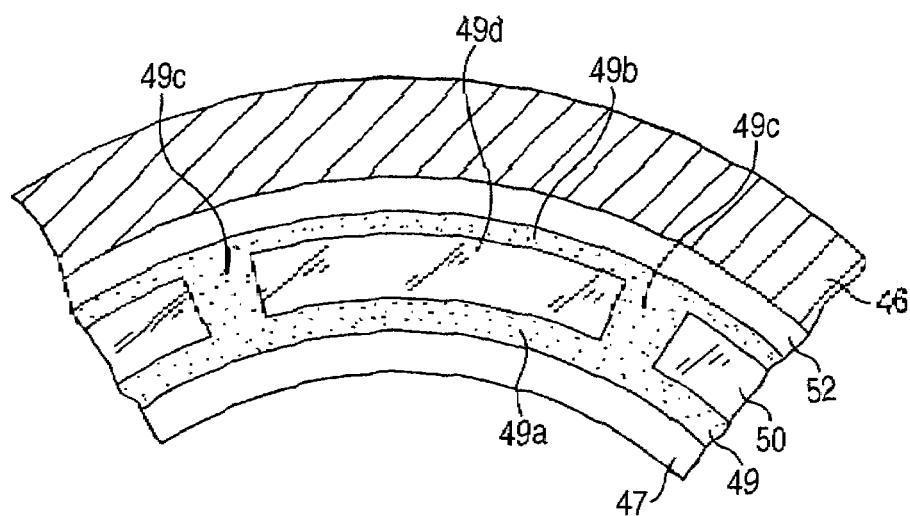
FIG. 4 is a sectional view taken along the line IV—IV in FIG. 3.

FIG. 3 and FIG. 4 show a second embodiment of the rolling bearing according to the present invention. In the following description, the "left and right" shall mean the left and right of FIG. 3.

This second embodiment shows a resin pulley unit suitably used for a compressor. The resin pulley unit is provided with a resin pulley body 46, and a rolling bearing 40 incorporated in the resin pulley body 46.

As shown in FIG. 3, the rolling bearing 40 has an inner race 41, an outer race 42, balls (rolling elements) 43 provided between central portions of the two races 41, 42, a retainer 44 adapted to retain the balls 43, and left and right seal members 45, 45 provided between left and right end portions of the two races 41, 42.

The pulley 46 is formed out of a phenolic resin and the like, and has a smaller-diameter portion 46a, an intermediate portion 46b and a larger-diameter portion 46c which are concentric with one another. An outer surface of the larger-diameter portion 46c is provided with a plurality of circumferentially extending V-grooves 46d. A right end section of the smaller-diameter portion 46a is provided with an inwardly directed flange portion 46e, and the outer race 42 of the rolling bearing 40 is press fitted from the left side into the inner surface of the smaller-diameter portion 46a and positioned by the inwardly directed flange portion 46e.

The inner surfaces of the left and right end portions of the outer race 42 are provided with annular grooves 47, 47. The portions of the outer surfaces of the inner race 41 which are opposed to these annular grooves 47, 47 are also provided with annular grooves 48, 48 respectively.

The left and right seal members 45, 45 are formed in the same shape, and each of these members includes a ring-shaped rubber seal 49, and a ring-shaped core metal 50 of iron applied to the rubber seal from the axially inward side thereof and thereby reinforcing the same, these seal members being arranged symmetrically. The seal members 45, 45 are fitted at outer circumferential edge portions thereof into the annular grooves 47, 47 of the outer race 42, and in sliding contact at inner circumferential edge portions thereof with the annular grooves 48, 48 of the inner race 41.

As shown in detail in FIG. 4, the rubber seal 49 of the seal member 45 includes the inner circumferential side annular portion 49a fixed to the inner circumferential edge portion of the core metal 50, outer circumferential side annular portion 49b fixed to the outer circumferential portion of the core metal 50, and a plurality of connecting portions 49c by which the two annular portions 49a, 49b are joined together. The rubber seal is formed so that, when the portion 49d between the connecting portion 49c and adjacent connecting portion 49c is removed, a part of the outer side surface (left side surface of the core metal 50 of the left seal member 45 and right side surface of the core metal 50 of the right seal member 45) of the core metal 50 is exposed.

According to the resin pulley unit in this embodiment, the heat is liable to be confined in the rolling bearing 40 due to the low thermal conductivity of the resin pulley 46. However, owing to the exposed part of the outer side surface of the core metal 50, the heat radiating effect is improved, and the disadvantages of the resin pulley 46 are eliminated. Therefore, this resin pulley unit can be applied easily to a compressor.

Third Embodiment

Figure 5:
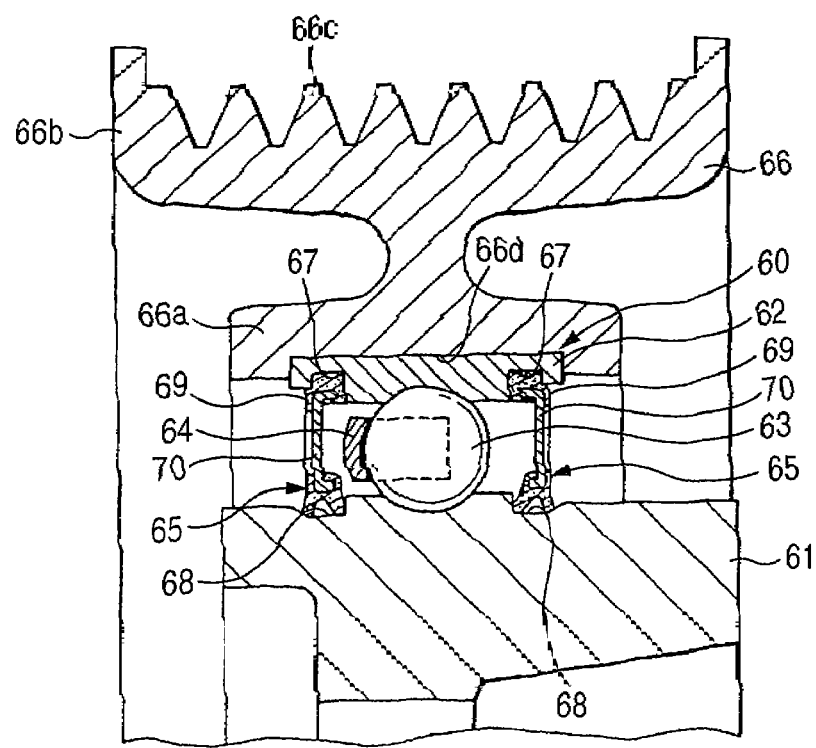
FIG. 5 is a longitudinal sectional view showing a third embodiment of the rolling bearing according to the present invention.
Figure 6:
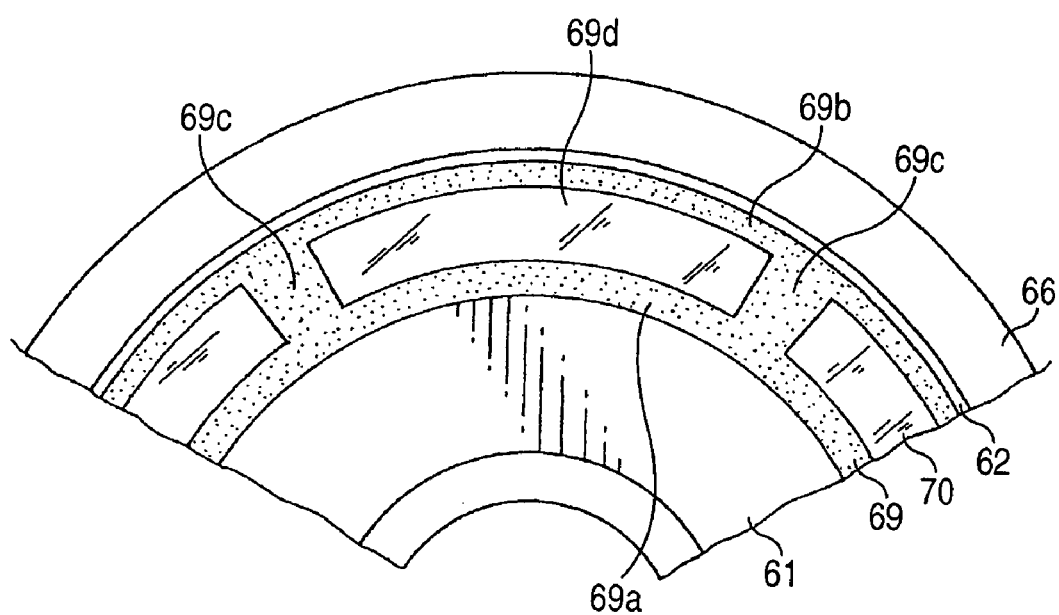
FIG. 6 is a side view of the same.

The resin pulley is used in an apparatus other than the compressor. FIG. 5 and FIG. 6, show a resin pulley unit used suitably for an idler pulley and in a third embodiment of the rolling bearing according to the present invention.

Referring to the same drawings, the resin pulley unit is provided with a resin pulley body 66, and a rolling bearing 60 incorporated therein.

As shown in FIG. 5, the rolling bearing 60 has an inner race 61, an outer race 62, balls (rolling elements) 63 provided between central portions of the two races 61, 62, a retainer 64 adapted to retain the balls 63, and left and right seal members 65, 65 provided between left and right end portions of the two races 61, 62. A resin pulley 55 is fixed to outer surface of the outer race 62.

The pulley 66 is made of a phenolic resin, and has a smaller-diameter portion 66a and a larger-diameter portion 66b which are concentric with each other. In this embodiment, the pulley 66 is formed so as to be integral with the outer race 62, not by press fitting the outer race 62 into the pulley 66 but by injection molding a material for the pulley 66 on the outer surface of the outer race 62. The pulley 66 is provided in the outer surface of the larger-diameter portion 66b with a plurality of circumferentially extending V-grooves 66c, while the inner surface of the smaller-diameter portion 66a of the pulley 66 is provided with an annular recess 66d in which the outer surface of the outer race 62 is fitted so that the outer race 62 cannot be axially moved.

The resin pulley unit is used as an idler pulley (idler or tensioner) for a belt transmission mechanism by fixing the inner race 61 of the rolling bearing 60 to a tension regulation portion. According to the resin pulley unit in this embodiment, the heat is liable to be confined in the rolling bearing 60 due to a low thermal conductivity of the resin pulley 66. However, since a part of the outer side surface of the core metal 70 is exposed, the heat radiation effect is improved, and the disadvantages of the resin pulley 66 are thereby eliminated.

In the above-described embodiments, the portions 29d, 49d, 69d to be removed extending between the connecting portions 29c, 49c, 69c of the rubber seals 29, 49, 69 may not be necessarily removed completely. These portions to be removed may also be formed as thin-walled portions. The thin-walled portions can be made in a step of forming rubber seals 29, 49, 69, by removing the portions extending between the connecting portions, applying the resultant product to the core metal 30, 50, 70, and heating this product under pressure. The thickness of the thin-walled portions is set, for example, not larger than 0.2 mm (more preferably not larger than 0.1 mm), or not larger than ⅓ of the thickness of the connecting portions (thick-walled portions) 29c, 49c, 69c.

In the above-described embodiments, the inner circumferential side annular portions 29a, 49a, 69a and outer circumferential side annular portions 29b, 49b, 69b of the rubber seals 29, 49, 69 are all formed as annular parts of a predetermined thickness. These annular portions 29a, 49a, 69a, 29b, 49b, 69b may also be provided with portions to be removed or thin-walled portions.

The core metals 30, 50, 70 may be made of plates of aluminum and copper (both of which include alloys thereof) instead of iron plates. This causes the heat radiating characteristics of the core metals and the seizure-free lifetime of the rolling bearing to be improved.

The above embodiments are described about rolling bearings in apparatuses in which the resin pulley 15, 46, 66 is used. It is a matter of course that these rolling bearings be also used as general-purpose rolling bearings.

Fourth Embodiment

Figure 7:
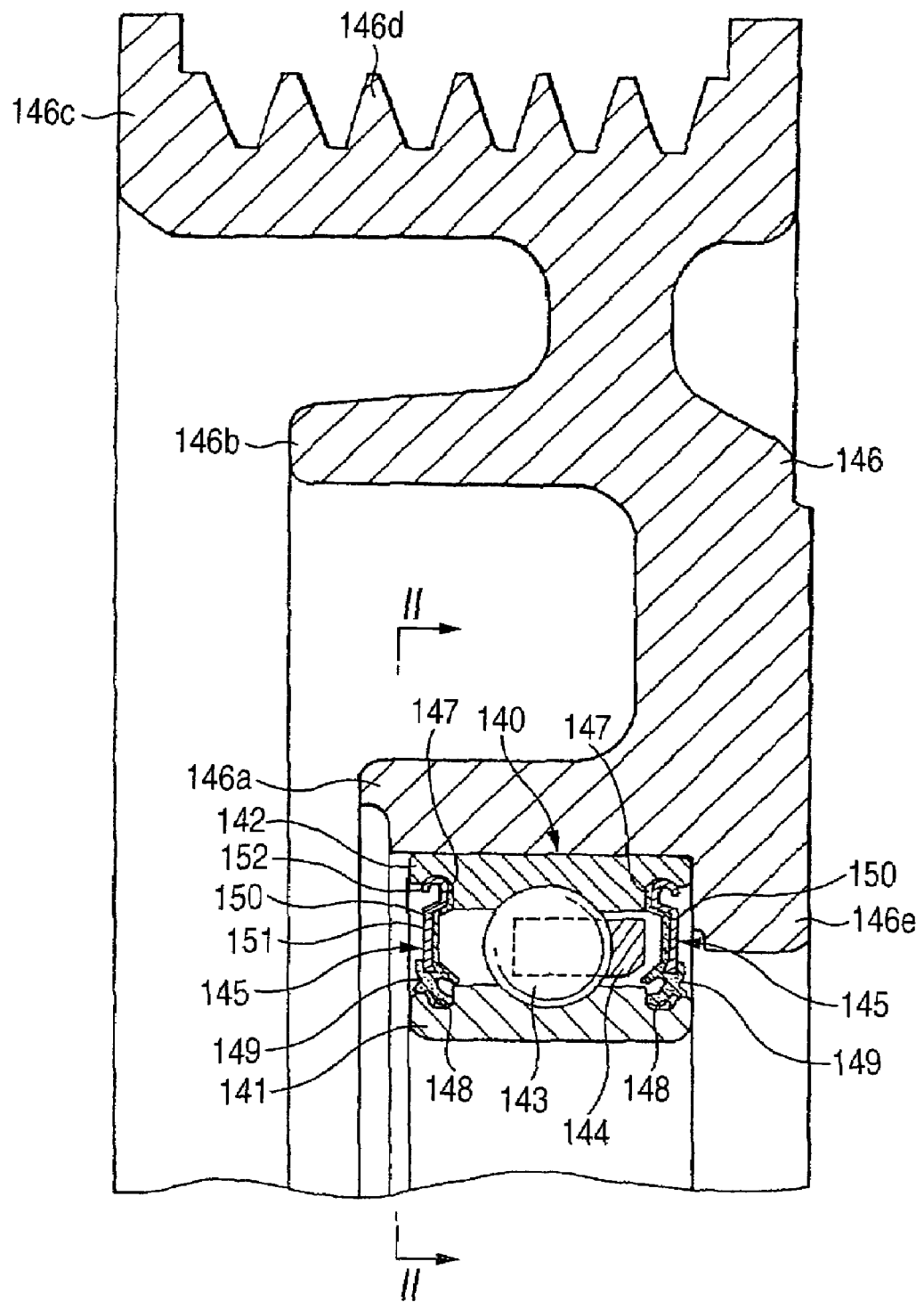
FIG. 7 is a longitudinally sectional view showing the rolling bearing according to a fourth embodiment of the present invention and the resin pulley unit into which the rolling bearing is incorporated.
Figure 8:
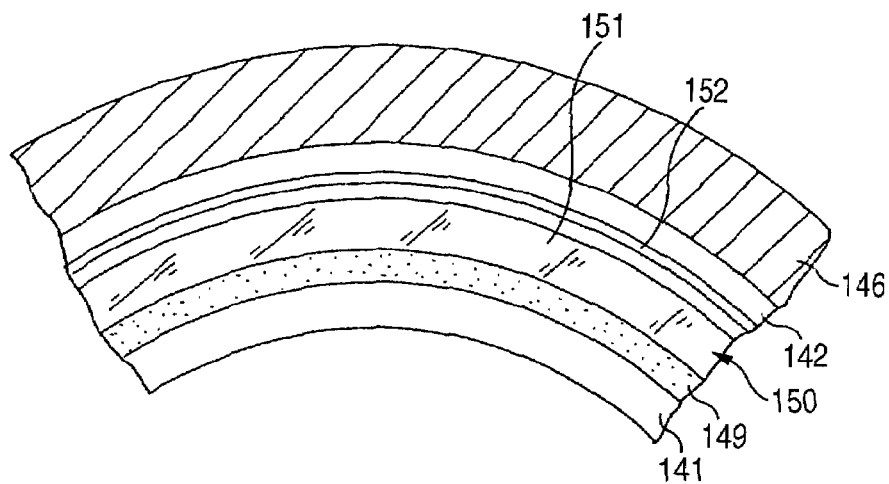
FIG. 8 is a sectional view taken on line II—II in FIG. 7.
Figure 9:
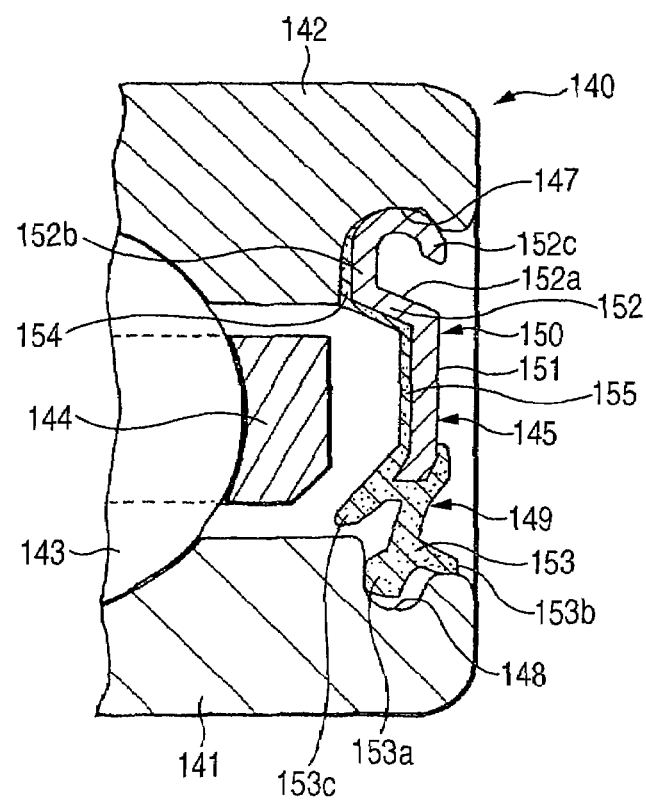
FIG. 9 is a longitudinally enlarged sectional view of the primary portion of the rolling bearing.

FIGS. 7 to 9 are views showing the fourth embodiment of the rolling bearing of the present invention and the resin pulley unit into which the rolling bearing is incorporated. In the following explanations, the right and left are defined as the right and left shown in FIG. 7.

This fourth embodiment shows a resin pulley unit suitably used for a compressor. The resin pulley unit is provided with a resin pulley body 146, and a rolling bearing 140 incorporated in the resin pulley body 146.

As shown in FIG. 7, the rolling bearing 140 has an inner race 141, an outer race 142, balls (rolling elements) 143 provided between central portions of the two races 141, 142, a retainer 144 adapted to retain the balls 143, and left and right seal members 145, 145 provided between left and right end portions of the two races 141, 142.

The pulley 146 is formed out of a phenolic resin and the like, and has a smaller-diameter portion 146a, an intermediate portion 146b and a larger-diameter portion 146c which are concentric with one another. An outer surface of the larger-diameter portion 146c is provided with a plurality of circumferentially extending V-grooves 146d. A right end section of the smaller-diameter portion 146a is provided with an inwardly directed flange portion 146e, and the outer race 42 of the rolling bearing 140 is press fitted from the left side into the inner surface of the smaller-diameter portion 146a and positioned by the inwardly directed flange portion 146e.

In the inner diameter portions of the right and the left end portion of the outer race 142, the annular grooves 147, 147 are respectively formed. The sectional shape of each annular groove is substantially arcuate. The outside circumferential wall of each annular groove in the axial direction is lower than the inside circumferential wall of the annular groove in the axial direction so that the seal member 145 can be easily press-fitted into the annular groove. That is, the inner diameter the outside circumferential wall of each annular groove in the axial direction is larger than the inner diameter of the inside circumferential wall of the annular groove in the axial direction. In the outer diameter portions of the inner race 141 opposed to the annular grooves 147, 147, the annular grooves 148, 148, the cross-sectional shapes of which are substantially arcuate, are formed.

The right and the left seal member 145, 145 are formed into the same shape and arranged symmetrically to each other. Each seal member includes: a shielding plate 150 made of metal; and a rubber seal 149.

The shielding plate 150 includes: an annular disk portion 151; and a bent edge portion 152 provided in an outer circumferential edge portion of the disk portion 151.

As shown in FIG. 9, the bent edge portion 152 includes: an inclined portion 152a continuing to the outer circumferential edge portion of the disk portion 151, extending inward in the axial direction and also extending outward in the radial direction; a linear portion 152b, the cross section of which is substantially linear, continuing to the inclined portion 152a, extending outward in the radial direction; and a curved portion 152c, the cross section of which is substantially arcuate, continuing to the linear portion 152b, extending outward in the axial direction.

The curved portion 152c of the bent edge portion 152 is formed into a shape corresponding to the shape of the annular groove 147 of the outer race 142, the cross section of which is substantially arcuate. The curved portion 152c of the bent edge portion 152 is tightly fitted into the annular groove 147 so that it can be directly contacted with a bottom face of the annular groove 147.

In the inner circumferential edge portion of the disk portion 151 of the shielding plate 150, while almost all the outside face of the disk portion 151 in the axial direction is being exposed, the lip portion 153 coming into slide contact with the annular groove 148 of the inner race is provided. The lip portion 153 includes: a primary contact lip 153a slidably coming into contact with the inside face of the annular groove 148; a subsidiary contact lip 153b coming into slide contact with the outer diameter portion of the circumferential wall outside the annular groove 148; and a non-contact lip 153c opposed to the outer diameter portion of the inside circumferential wall of the annular groove 148.

On an inside face in the axial direction of the linear portion 152b of the bent edge portion 152, the elastic body 154 for sealing is bonded, which comes into contact with the inside face of the annular groove 147 of the outer race 142 so that a portion between the linear portion 152b of the bent edge portion 152 and the outer race 142 can be tightly sealed up. In this embodiment, the lip portion 153 and the elastic body 154 for sealing are connected to each other via the thin connecting portion 155 which is bonded to an inside face in the axial direction of the disk portion 151. The lip portion 153, the elastic body 154 for sealing and the connecting portion 155 are made of the same material integrated into one body as a rubber seal 149.

According to the resin pulley unit of this embodiment, since the thermal conductivity of the pulley 146 made of resin is low, heat is liable to be confined in the rolling bearing 140. However, since the bent edge portion 152 of the shielding plate 150 is directly contacted with the outer race 142 and further the outside of the shielding plate 150 is exposed, the heat radiating effect is enhanced, and the disadvantages of the pulley 146 made of resin are dissolved. The shielding plate 150 and the inner ring 141 are tightly sealed up from each other by the lip portion 153 and further the shielding plate 150 and the outer race 142 are tightly sealed up from each other by the elastic body 154 for sealing. Therefore, even when the rolling bearing is rotated at high speed, the sealing performance can be maintained sufficiently high. Accordingly, this resin pulley unit is appropriately used for a compressor.

Fifth Embodiment

Figure 10:
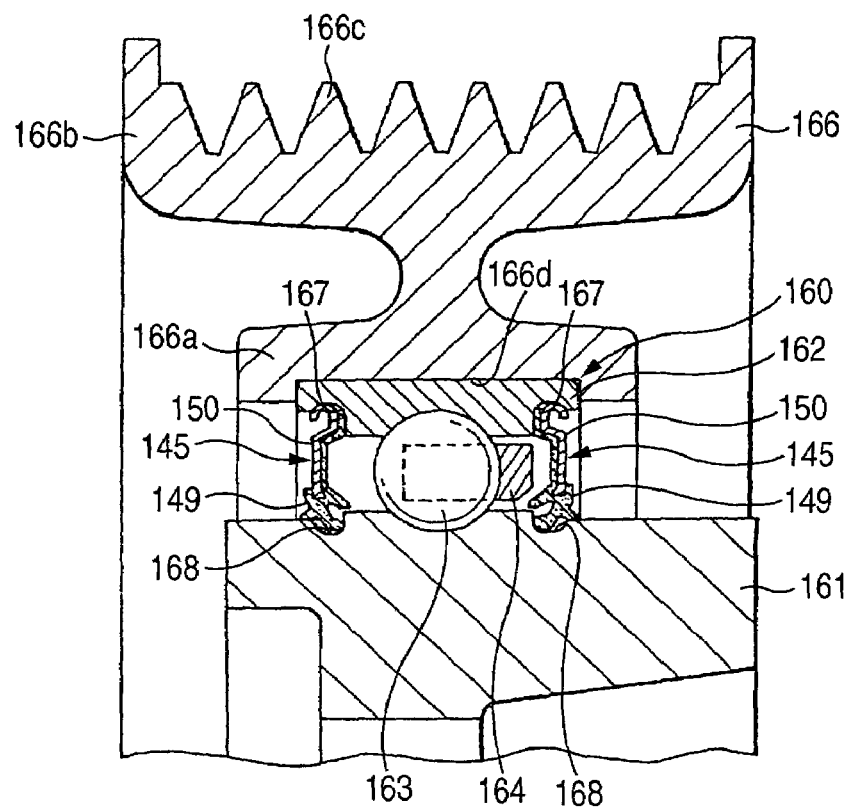
FIG. 10 is a longitudinally sectional view showing a fifth embodiment of the rolling bearing of the present invention and the resin pulley unit into which the rolling bearing is incorporated.
Figure 11:
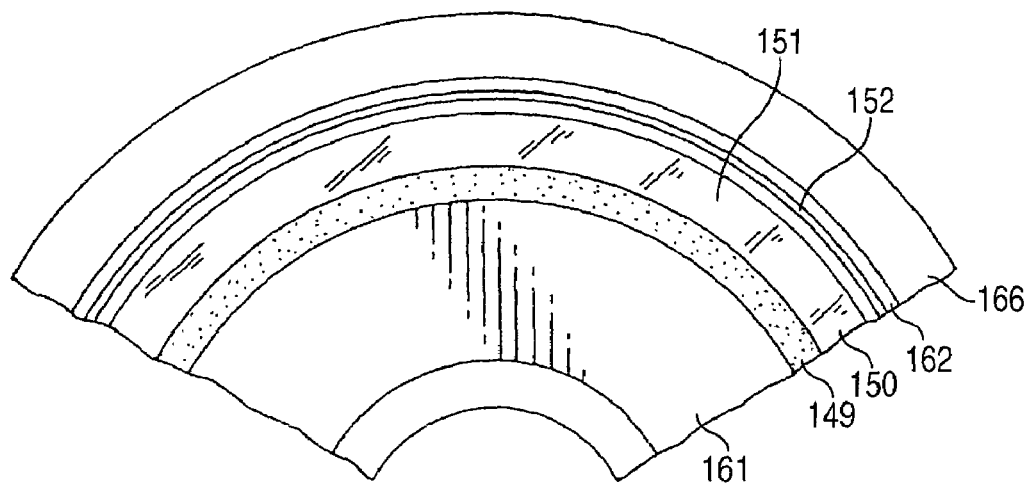
FIG. 11 is a side view of the primary portion of the rolling bearing of the present invention and the resin pulley unit into which the rolling bearing is incorporated.

The use of the pulley made of resin is not limited to a compressor, but the pulley made of resin is used for other apparatus. FIGS. 10 and 11 are views showing a resin pulley unit of the rolling bearing according to the fifth embodiment of the present invention. This resin pulley unit is preferably used as an idler pulley.

In the view, the resin pulley unit includes: a resin pulley body 166; and a rolling bearing 160 incorporated into the resin pulley body 166.

As shown in FIGS. 10 and 11, the rolling bearing 160 includes: an inner race 161; an outer race 162; balls (rolling elements) 163 arranged between both the races 161, 162; a cage 164 for holding the balls 163; and a right and a left seal member 145, 145 arranged on the right and the left of both the races 161, 162. The pulley 166 made of resin is fixed to the outer diameter portion of the outer race 162. The right and the left seal member 145, 145 are the same as those of the fifth embodiment. Therefore, the detailed explanations of the seal members are omitted here.

The pulley 166 is made of resin such as phenol and others and includes a small diameter portion 166a and a large diameter portion 166b which are arranged concentrically to each other. In this embodiment, the outer race 162 is not press-fitted into the pulley 166, but the pulley 166 is integrated with the outer race 162 when injection molding is conducted on the outer diameter portion of the outer race 162 so as to mold the pulley 166. In an outer diameter portion of the large diameter portion 166b of the pulley 166, a plurality of V-shaped grooves 166c are formed in the circumferential direction. In an inner diameter portion of the small diameter portion 166a of the pulley 166, the annular recess portion 166d is formed, by which the outer diameter portion of the outer race 162 can not be moved in the axial direction.

According to the resin pulley unit of this embodiment, since the thermal conductivity of the pulley 166 made of resin is low, heat is liable to be confined in the rolling bearing 160. However, since the bent edge portion 152 of the shielding plate 150 is directly contacted with the outer race 162 and further the outside of the shielding plate 150 is exposed, the heat radiating effect is enhanced, and the disadvantages of the pulley 146 made of resin are dissolved.

In the above embodiment, the lip portion 153 and the elastic body 154 for sealing are connected to each other by the thin connecting portion 155. However, of course, the lip portion and the elastic body for sealing may be made of different materials and the connecting portion may be omitted.

The shielding plate 150 may be made of plates of aluminum and copper (both of which include alloys thereof) instead of iron plates. This causes the heat radiating characteristics of the shielding plate 150 and the seizure-free lifetime of the rolling bearing to be improved.

The above embodiments are described about rolling bearings in apparatuses in which the resin pulley 46, 66 is used. It is a matter of course that these rolling bearings be also used as general-purpose rolling bearings.

Sixth Embodiment

Figure 12:
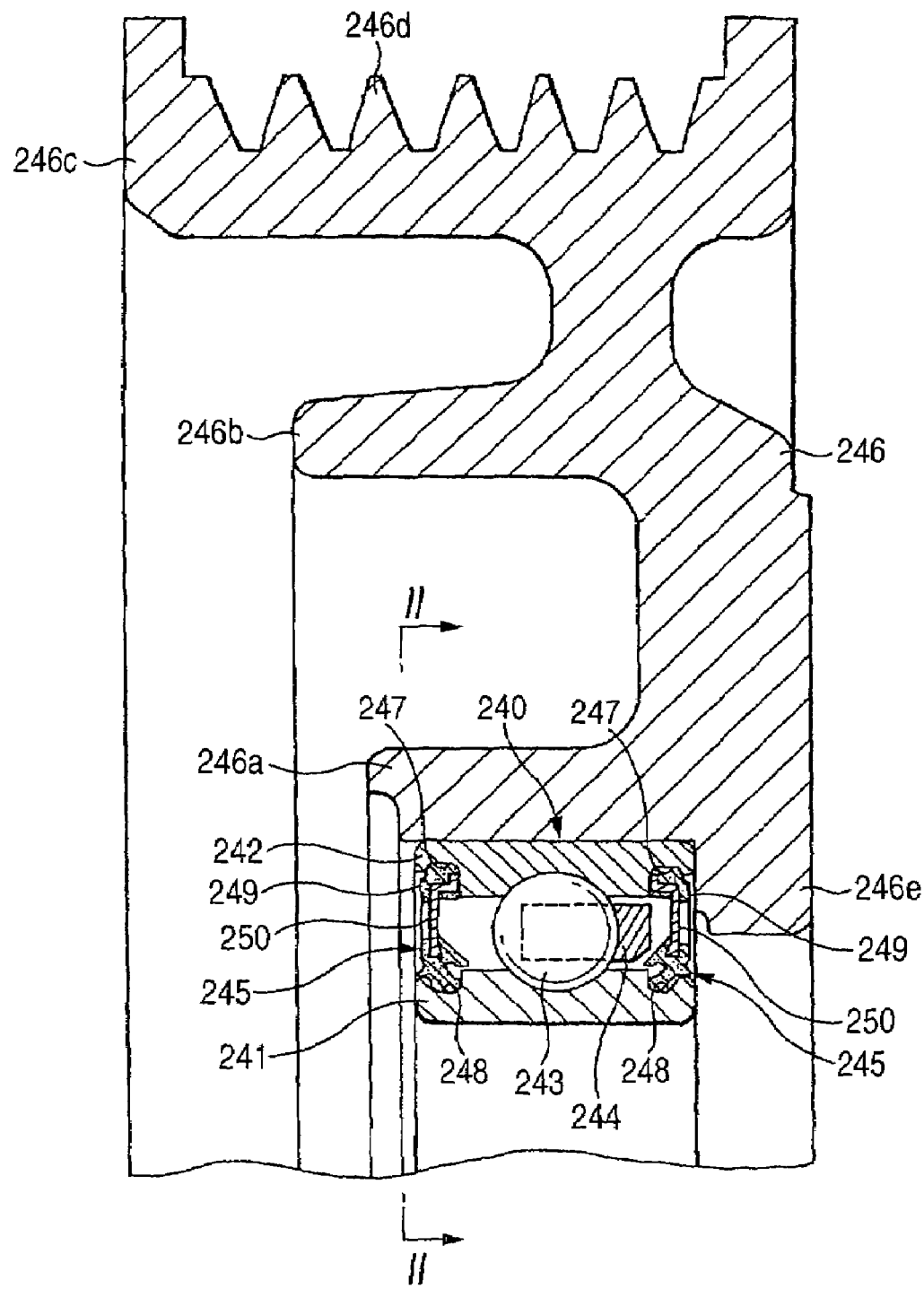
FIG. 12 is a longitudinally sectional view showing the rolling bearing according to a sixth embodiment of the present invention and the resin pulley unit into which the rolling bearing is incorporated.
Figure 13:
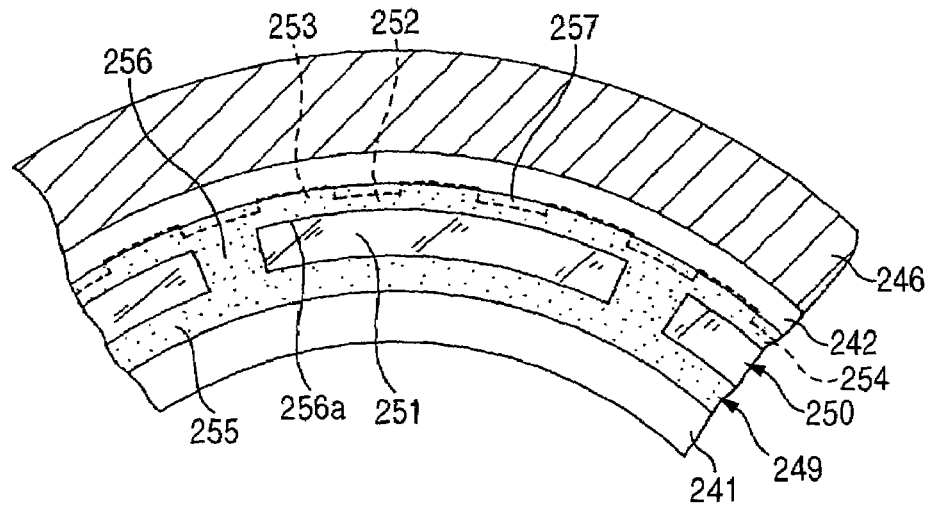
FIG. 13 is a sectional view taken on line II—II in FIG. 12.

FIGS. 12 and 13 are views showing the sixth embodiment of the rolling bearing of the present invention and the resin pulley unit into which the rolling bearing is incorporated. In the following explanations, the right and left are defined as the right and left shown in FIG. 12.

This sixth embodiment shows a resin pulley unit suitably used for a compressor. The resin pulley unit is provided with a resin pulley body 246, and a rolling bearing 240 incorporated in the resin pulley body 246.

As shown in FIG. 12, the rolling bearing 240 has an inner race 241, an outer race 242, balls (rolling elements) 243 provided between central portions of the two races 241, 242, a retainer 244 adapted to retain the balls 243, and left and right seal members 245, 245 provided between left and right end portions of the two races 241, 242.

The pulley 246 is formed out of a phenolic resin and the like, and has a smaller-diameter portion 246a, an intermediate portion 246b and a larger-diameter portion 246c which are concentric with one another. An outer surface of the larger-diameter portion 246c is provided with a plurality of circumferentially extending V-grooves 246d. A right end section of the smaller-diameter portion 246a is provided with an inwardly directed flange portion 246e, and the outer race 242 of the rolling bearing 240 is press fitted from the left side into the inner surface of the smaller-diameter portion 246a and positioned by the inwardly directed flange portion 246e.

The inner surfaces of the left and right end portions of the outer race 242 are provided with annular grooves 247, 247. The portions of the outer surfaces of the inner race 241 which are opposed to these annular grooves 247, 247 are also provided with annular grooves 248, 248 respectively.

The left and right seal members 245, 245 are formed in the same shape, and each of these members includes a ring-shaped rubber seal 249, and a ring-shaped core metal 250 of iron applied to the rubber seal from the axially inward side thereof and thereby reinforcing the same, these seal members being arranged symmetrically. The seal members 245, 245 are fitted at outer circumferential edge portions thereof into the annular grooves 247, 247 of the outer race 242, and in sliding contact at inner circumferential edge portions thereof with the annular grooves 248, 248 of the inner race 241.

Figure 14:
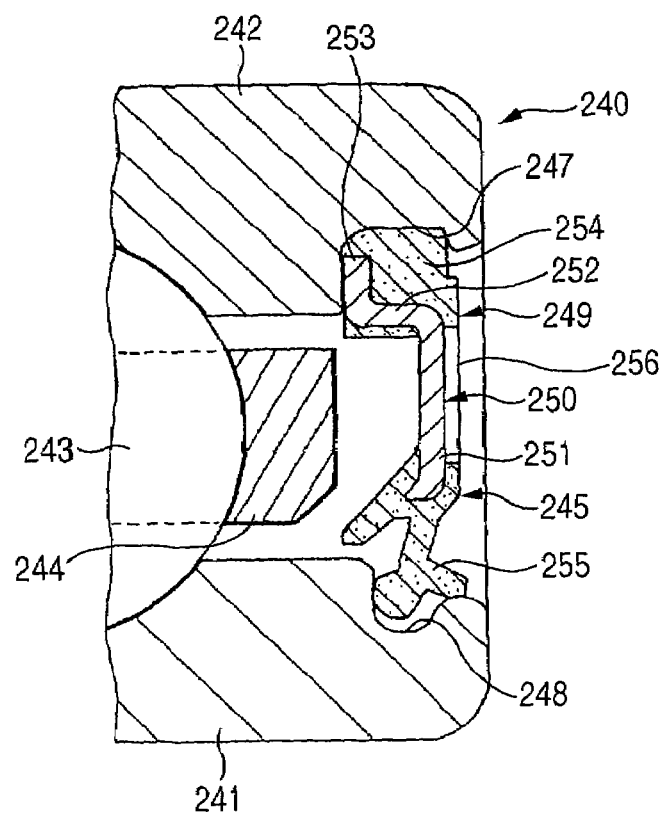
FIG. 14 is a longitudinally enlarged sectional view of the primary portion of the rolling bearing.

As shown in FIGS. 13 and 14, the core metal 250 includes: a disk portion 251; a short cylindrical portion 252 continuing to the outer circumferential edge portion of the disk portion 251, extending inward in the axial direction; and a plurality of bent edge portions 253 extending from the inside edge portion in the axial direction of the short cylindrical portion 252 to the outside in the radial direction. The bent edge portions 253 are directly contacted with the circumferential walls of the annular grooves 247, 247 of the outer race 242.

The rubber seal 249 includes: an engaging portion 254 bonded to an outer circumferential portion of the short cylindrical portion 252 of the core metal 250, press-fitted into the annular groove 247 provided in the outer race 242; a sliding portion 255 bonded to an inner circumferential edge portion of the disk portion 251 of the core metal 250, coming into slide contact with the annular groove 248 of the inner race 241; and a disk portion 256 connected to the engaging portion 254 with the sliding portion 255, bonded to the disk portion 251 of the core metal 250, wherein the engaging portion 254 has a filling portion 257 for filling up a gap between the bent edge portions 253, which are adjacent to each other, so that the adhesion property with respect to the core metal 250 can be enhanced. In the disk portion 256, the cutout portions 256a are provided in the circumferential direction at regular intervals. Due to the foregoing, a portion of the outside of the core metal 250 can be exposed, that is, the left side of the core metal 250 of the left seal member 245 and the right side of the core metal 250 of the right seal member 245 are exposed.

According to the resin pulley unit of this embodiment, since the thermal conductivity of the pulley 246 made of resin is low, heat is liable to be confined in the rolling bearing 240. However, when the bent edge portions 253 of the core metal 250 are directly contacted with the outer race 242 and further a portion of the outside of the core metal 250 is exposed, the heat radiating effect is enhanced and the disadvantages of the pulley 246 made of resin can be dissolved. Accordingly, this resin pulley unit can be easily applied to a compressor.

Seventh Embodiment

Figure 15:
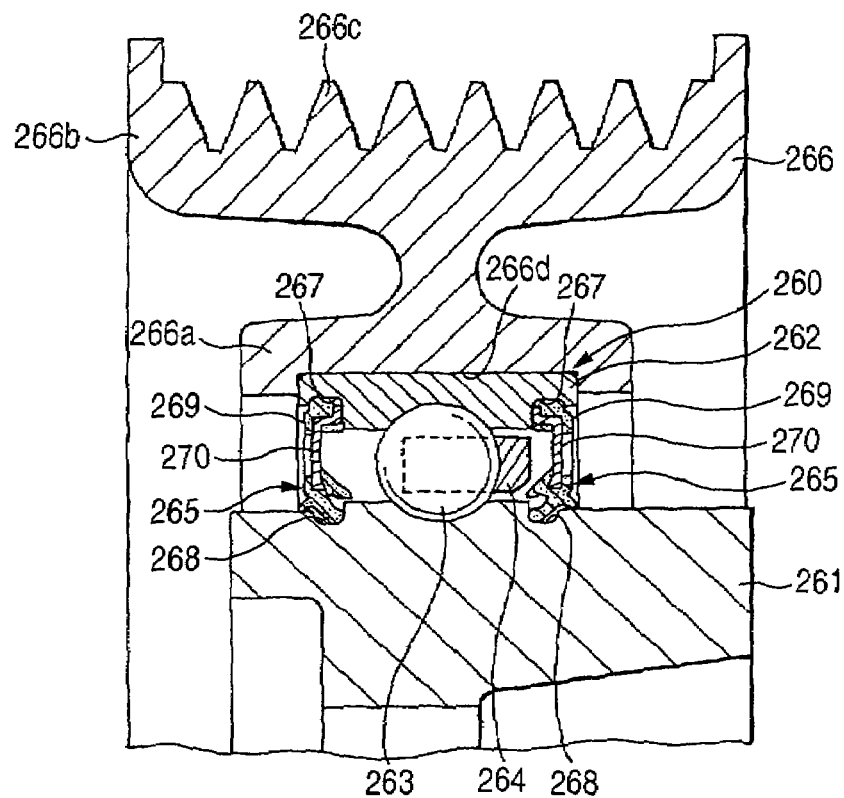
FIG. 15 is a longitudinally sectional view showing the rolling bearing according to the seventh embodiment of the present invention and the resin pulley unit into which the rolling bearing is incorporated.
Figure 16:
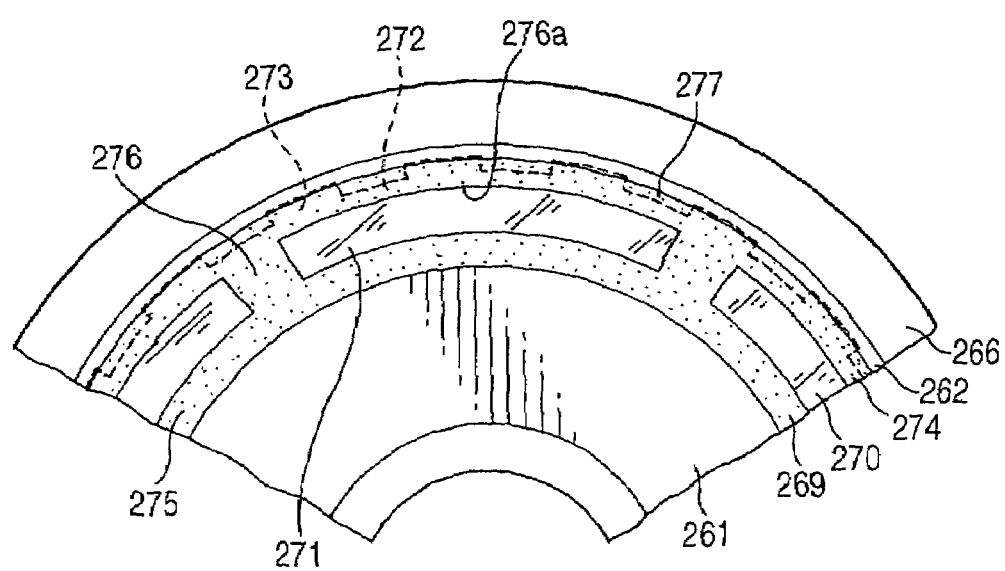
FIG. 16 is a laterally sectional view showing the second embodiment of the rolling bearing of the present invention and the resin pulley unit into which the rolling bearing is incorporated.

The use of the pulley made of resin is not limited to a compressor, but the pulley made of resin is used for other apparatus. FIGS. 15 and 16 are views showing a resin pulley unit of the rolling bearing according to the seventh embodiment of the present invention. This resin pulley unit is preferably used as an idler pulley.

In the view, the resin pulley unit includes: a resin pulley body 266; and a rolling bearing 260 incorporated into the resin pulley body 266.

As shown in FIGS. 15, the rolling bearing 260 includes: an inner race 261; an outer race 262; balls (rolling elements) 263 arranged between both the races 261, 262; a cage 264 for holding the balls 263; and a right and a left seal member 245, 245 arranged on the right and the left of both the races 261, 262. The pulley 166 made of resin is fixed to the outer diameter portion of the outer race 262. The right and the left seal member 245, 245 are the same as those of the fifth embodiment. Therefore, the detailed explanations of the seal members are omitted here.

The pulley 266 is made of resin such as phenol and others and includes a small diameter portion 266a and a large diameter portion 266b which are arranged concentrically to each other. In this embodiment, the outer race 262 is not press-fitted into the pulley 266, but the pulley 266 is integrated with the outer race 262 when injection molding is conducted on the outer diameter portion of the outer race 262 so as to mold the pulley 266. In an outer diameter portion of the large diameter portion 266b of the pulley 266, a plurality of v-shaped grooves 266c are formed in the circumferential direction. In an inner diameter portion of the small diameter portion 266a of the pulley 266, the annular recess portion 266d is formed, by which the outer diameter portion of the outer race 262 can not be moved in the axial direction.

As shown in FIG. 16 in detail, the core metal 270 includes: a disk portion 271; a short cylindrical portion 272 continuing to the outer circumferential edge portion of the disk portion 271, extending inward in the axial direction; and a plurality of bent edge portions 273 extending from the inside edge portion in the axial direction of the short cylindrical portion 272 to the outside in the radial direction. The bent edge portions 273 are directly contacted with the circumferential walls of the annular grooves 267, 267 of the outer race 262. The rubber seal 269 includes: an engaging portion 274 bonded to an outer circumferential portion of the short cylindrical portion 272 of the core metal 270, press-fitted into the annular groove 267 provided in the outer race 262; a sliding portion 275 bonded to an inner circumferential edge portion of the disk portion 271 of the core metal 270, coming into slide contact with the annular groove 268 of the inner race 261; and a disk portion 276 connected to the engaging portion 274 and the sliding portion 275, bonded to the disk portion 271 of the core metal 270, wherein the engaging portion 274 has a filling portion 277 for filling up a gap between the bent edge portions 273, which are adjacent to each other, so that the adhesion property with respect to the core metal 270 can be enhanced. In the disk portion 276, the cutout portions 276a are provided in the circumferential direction at regular intervals. Due to the foregoing, a portion of the outside of the core metal 270 can be exposed, that is, the left side of the core metal 270 of the left seal member 265 and the right side of the core metal 270 of the right seal member 265 are exposed.

According to the resin pulley device of this embodiment, since the thermal conductivity of the pulley 266 made of resin is low, heat is liable to be confined in the rolling bearing 260. However, when the bent edge portions 273 of the core metal 270 are directly contacted with the outer race 262 and further a portion of the outside of the core metal 270 is exposed, the heat radiating effect is enhanced and the disadvantages of the pulley 246 made of resin can be dissolved.

In this connection, in each embodiment described above, the cutout portions 256, 276 provided in the disk portions 256, 276 of the rubber seals 249, 269 are not necessarily formed in such a manner that the portions to be cut out are perfectly cut out. Alternatively, the portions to be cut out may be formed into thin portions. The thin portions may be formed as follows. In the stage of forming the rubber seals 249, 269, portions corresponding to the cutout portions 256, 276 are deleted, and these are heated while the core metals 250, 270 are being set to this. The thickness of the thin portion is, for example, not more than 0.2 mm. It is preferable that the thickness of the thin portion is not more than 0.1 mm. Alternatively, the thickness of the thin portion is not more than 1/3 of the thickness of the thick portion of the disk portion 256, 276. In the embodiment, the bent edge portions 253, 273 of the core metals 250, 270 are directly contacted with the circumferential walls of the annular grooves 247, 267 of the outer races 242, 262, however, the bent edge portions 253, 273 of the core metals 250, 270 may be contacted with the outer races 242, 262 via the thin portion, the thickness of which is not more than 0.2 mm (preferably not more than 0.1 mm). The important point is that the core metals 250, 270 and the outer races 242, 262 are not thermally insulated from each other but the bent edge portions 253, 273 of the core metals 250, 270 and the outer races 242, 262 are contacted with each other so that heat can be transmitted from one of them to the other.

What is claimed is:

1. A rolling bearing comprising:
    an inner race;
    an outer race coaxial with the inner race;
    rolling elements provided between the inner and outer races; and
    a seal member provided between end portions of the inner and outer races, which includes a core metal and a rubber seal including a recess and a projection at an outer surface thereof, wherein at least a part of an outer surface of the core metal is exposed to an area outside of the rolling bearing.

2. The rolling bearing according to claim 1, wherein the core metal comprises a material having thermal conductivity higher than that of iron.

3. The rolling bearing according to claim 2, wherein the material comprises one of aluminum and copper.

4. The rolling bearing according to claim 1, wherein
    the rubber seal includes an inner annular portion, an outer annular portion and a plurality of connecting portions connecting the inner annular portion to the outer annular portion, and
    the plurality of connecting portions defines the projection and portions between the plurality of connecting portions defines the recess.

5. The rolling bearing according to claim 4, wherein a part of the core metal corresponding to the portions between the plurality of connecting portions is exposed by a recess in the rubber seal.

6. The rolling bearing according to claim 5, wherein the part of the core metal corresponding to the portions between the plurality of connecting portions is exposed by a recess in the rubber seal.

7. The rolling bearing according to claim 4, wherein the portions between the plurality of connecting portions comprise through holes.

8. The rolling bearing according to claim 4, wherein the portions between the plurality of connecting portions comprise thin wall portions.

9. The rolling bearing according to claim 1, wherein the core metal directly contacts the outer race.

10. The rolling bearing according to claim 1, wherein the core metal comprises a heat radiating portion.

11. The rolling bearing according to claim 1, wherein the seal member is disposed in grooves formed in the inner race and the outer race.

12. The rolling bearing according to claim 1, wherein an inner circumferential side annular portion of the rubber seal is fixed to an inner circumferential edge portion of the core metal.

13. The rolling bearing according to claim 1, wherein an outer circumferential side annular portion of the rubber seal is fixed to an outer circumferential portion of the core metal.

14. A resin pulley unit comprising:
    a resin pulley body provided with a plurality of V-grooves in an outer surface thereof; and
    a rolling bearing fixed to an inner surface of the pulley body, the rolling bearing including:
        an inner race;
        an outer race coaxial with the inner race;
        rolling elements provided between the inner and outer races;
        a seal member provided between end portions of the inner and outer races, which includes a core metal and a rubber seal including a recess and a projection at an outer surface thereof, wherein at least a part of an outer surface of the core metal is exposed to an area outside of the rolling bearing.

* * * * *